J. B. MURRAY.
ELECTRIC HEATER.
APPLICATION FILED JUNE 28, 1915.

1,167,095.

Patented Jan. 4, 1916.

Witnesses:

Inventor
Joseph B. Murray
By his Attorney

UNITED STATES PATENT OFFICE.

JOSEPH B. MURRAY, OF BROOKLYN, NEW YORK.

ELECTRIC HEATER.

1,167,095.  Specification of Letters Patent.  Patented Jan. 4, 1916.

Application filed June 23, 1915. Serial No. 36,728.

*To all whom it may concern:*

Be it known that I, JOSEPH B. MURRAY, a citizen of the United States, residing at Brooklyn, in the county of Kings and State of New York, have invented a certain new and useful Improvement in Electric Heaters, of which the following is a specification.

The invention is an electric toaster, embodying a containing box of sheet metal, a heating element within and extending transversely across said box in a multiplicity of parallel portions, and a grid in said box for supporting the object to be heated above said heating element.

The invention consists in the construction hereinafter described, whereby the device is simplified and cheapened. To this end the box is made of a single piece of sheet metal stamped into form. The vertical partition walls which support the heating element are each single pieces of sheet metal connected to the box by tongues passing through openings in the bottom, and are each provided with longitudinal slots closed by plates of mica, through holes in which mica plates the heating wire is passed. Said mica plates are secured by bending over the edges of the partition walls. The grid is simply a number of parallel wires disposed in holes in the upper bent over edges of said partition walls. The joint between the ends of the heating wire and the circuit wires is arranged outside of the box and is inclosed in a cover box united to the containing box wall and filled with plaster or other insulating material. The construction of the joint is such that it cannot become loosened or disrupted by any ordinary handling of the device.

Figure 1:
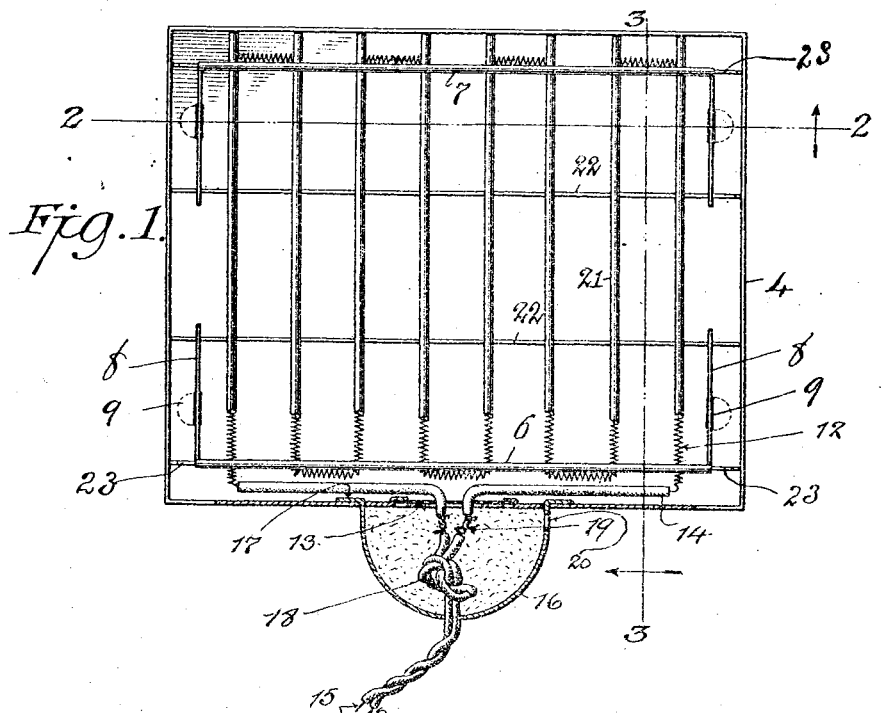
Figure 2:
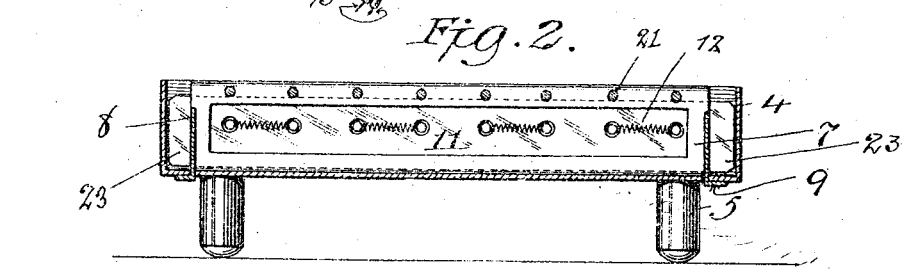
Figure 3:
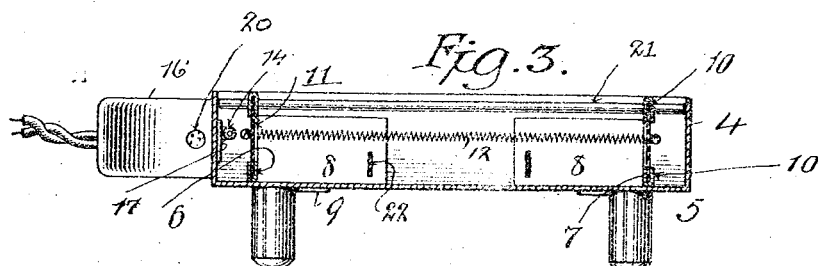

In the accompanying drawings—Figure 1 is a top view of my electric toaster. Fig. 2 is a section on the line 2, 2 of Fig. 1. Fig. 3 is a section on the line 3, 3 of Fig. 1.

Similar numbers of reference indicate like parts.

4 is a box of sheet metal, preferably formed in one piece by stamping, and provided with supporting legs 5.

6 and 7 are partition walls of similar metal, disposed parallel to one another within the box and at a distance from the longitudinal walls thereof. Said partition walls are alike, so that a description of one applies to both. The end portions 8 of each partition wall are bent at right angles and provided with tongues 9 which pass through openings in the bottom of the box and are turned against said bottom. In this way the partition walls 6, 7 are secured in vertical position in the box. The middle portion of each partition wall 6 or 7 is made wider than the end portions 8, so that the upper and lower longitudinal edges of said middle portion may be bent over, as shown at 10. In each partition wall is a longitudinal slot, closed by a plate 11 of mica or other insulating material which is held in place by the bent over edges 10. In the mica plates 11 are openings to receive the heating element, which may be a spiral wire 12 of chrome, nickel or other refractory conducting material, the said wire being passed through a hole in the mica plate of partition wall 6, then through the opposite hole in the mica plate of partition wall 7, then back of wall 7 and through the next adjacent hole in said last-named mica plate, then back to wall 6, and so on to produce a number of parallel portions extending transversely across box 4. The end portions of the heating element 12 lie in the space between partition wall 6 and the adjacent longitudinal wall of the box and are preferably covered with asbestos insulation, as shown at 14. Secured in said box wall is a plate 13, also of mica, having holes through which the insulated end portions 14 pass. In order to protect the joint between said end portions 14 and the circuit wires 15, here shown insulated and twisted together, I provide a semi-cylindrical cover box 16 of sheet metal, open on one side and having at the edges thereof tongues 17 which enter slots in the box wall and are bent over on the inner side of said wall to secure said box 16 in place. Before the box 16 is attached, however, I pass the circuit wires 15 through an opening in the semi-cylindrical wall of said box and make an enlargement upon them, such as the overhand knot 18, within said box. The ends of the heating element and the ends of the circuit wires, both denuded of insulation, are then twisted together, as shown at 19, or otherwise united. The cover box 16 is then secured, as described, to the containing box 4, and the space within box 16 is filled preferably with liquid plaster or other cement which sets on hardening, which is introduced through an opening 20 in the wall of said box. The object of the enlargement or knot 18 is to prevent any possibility of the circuit wires being drawn out of box 16, and the object of the plaster filling is to embed the joint within the box 16 in solid insulating material.

In order to form a grid for supporting the toast or other object subjected to the action of the heating element, I form in the upper bent over edges of the partition walls 6, 7, a number of holes which receive straight pieces 21 of (preferably copper) wire disposed parallel to one another. These pieces of wire are put in place in partition walls 6 and 7 before said walls are secured in box 4, and are of sufficient length closely to approximate at their ends the longitudinal walls of said box, whereby any longitudinal displacement of them after the parts are assembled is prevented.

In order to support the heating element against downward sagging, I provide bars 22 of sheet metal, which are placed in slots formed near the ends of the end portions 8 of partition walls 6 and 7, and these also are put in place before said walls are secured in box 4.

It is to be observed that this construction does away with all soldered joints, and substitutes tongues and slots. The joint between the heating wire ends and the circuit wires which cannot be soldered is made by uniting said portions mechanically outside of the box, where it is completely protected. All of the parts are also simplified. The boxes 4 and 16 are stamped out of single pieces of sheet metal. The partition walls 6 and 7 are alike, and are bent as required. The grid is a number of precisely similar pieces of wire cut to proper length, and the supporting bars 22 are strips similarly cut. The mica plates 11 are simple narrow strips, and can ordinarily be obtained from the clippings of larger mica plates used for various purposes in the arts. The ends of the mica plates 11 preferably extend beyond the ends of the partition walls 6, 7, as shown at 23, so as to form compartments between said walls and the walls of the box.

I claim:

1. An electric heater, comprising a containing box, two walls within said box having their end portions bent at right angles to their middle portion, tongues on the lower edges of said end portions adapted to enter openings in the bottom of said box, the middle portions of said walls being longitudinally slotted, plates of insulating material secured on said middle portions and covering said slots, and a heating element extending between and supported upon said insulating plates.

2. An electric heater, comprising a containing box, two walls within said box, each wall having its end portions bent at right angles and secured to the bottom of said box and having in its middle portion a longitudinal slot, a plate of insulating material covering the said slot in each wall and secured in place by bending over the longitudinal edges of said wall, and a wire-heating element extending between and supported upon said insulating plates.

3. An electric heater, comprising a containing box, two walls within said box, each wall having its end portions bent at right angles and secured to the bottom of said box, a wire-heating element supported on said walls and extending to and fro between them, and supporting bars extending between the bent end portions of each wall and disposed below said heating element.

4. An electric heater, comprising a containing box, two longitudinally slotted walls of metal within said box, the said walls having perforations above said slots, plates of insulating material secured on said walls and covering said slots, a wire-heating element extending between and supported upon said insulating plates, and a grid formed of loose metal rods extending through and inclosed in said wall perforations.

In testimony whereof I have affixed my signature in presence of two witnesses.

JOSEPH B. MURRAY.

Witnesses:
 GERTRUDE T. PORTER
 MAY T. McGARRY.